US012802487B2

(12) United States Patent
Shu et al.

(10) Patent No.: US 12,802,487 B2
(45) Date of Patent: Nov. 17, 2026

(54) DEEPFAKE DETECTION METHOD BASED ON IDENTITY AND FACE SHAPE FEATURES

(71) Applicants: Qilu University of Technology (Shandong Academy of Sciences), Jinan (CN); SHANDONG COMPUTER SCIENCE CENTER (NATIONAL SUPERCOMPUTING CENTER IN JINAN), Jinan (CN); Shandong Artificial Intelligence Institute, Jinan (CN)

(72) Inventors: Minglei Shu, Jinan (CN); Haoran Li, Jinan (CN); Pengyao Xu, Jinan (CN); Shuwang Zhou, Jinan (CN); Zhaoyang Liu, Jinan (CN); Zhe Zhu, Jinan (CN)

(73) Assignees: QILU UNIVERSITY OF TECHNOLOGY (SHANDONG ACADEMY OF SCIENCES), Jinan (CN); SHANDONG COMPUTER SCIENCE CENTER (NATIONAL SUPERCOMPUTING CENTER IN JINAN), Jinan (CN); SHANDONG ARTIFICIAL INTELLIGENCE INSTITUTE, Jinan (CN)

( * ) Notice: Subject to any disclaimer, the term of this patent is extended or adjusted under 35 U.S.C. 154(b) by 264 days.

(21) Appl. No.: 18/749,670

(22) Filed: Jun. 21, 2024

(65) Prior Publication Data

US 2025/0166411 A1 May 22, 2025

(30) Foreign Application Priority Data

Nov. 20, 2023 (CN) ......................... 202311546911.X

(51) Int. Cl.
*G06V 40/16* (2022.01)

(52) U.S. Cl.
CPC .......... *G06V 40/168* (2022.01); *G06V 40/172* (2022.01)

(58) Field of Classification Search
CPC .... G06V 40/168; G06V 10/454; G06V 10/82; G06V 20/41; G06V 20/46; G06V 40/171; G06N 3/0464; G06N 3/02–105
(Continued)

(56) References Cited

U.S. PATENT DOCUMENTS

2023/0401824 A1* 12/2023 Khan ................ G06V 10/7715

FOREIGN PATENT DOCUMENTS

| | | | |
|---|---|---|---|
| AU | 2019101186 | A4 | 1/2020 |
| CN | 112818915 | A | 5/2021 |

(Continued)

OTHER PUBLICATIONS

Dong, Xiaoyi, et al. Identity-Driven DeepFake Detection. Dec. 7, 2020. (Year: 2020).*

(Continued)

*Primary Examiner* — Ping Y Hsieh
*Assistant Examiner* — Karsten Foster Lantz
(74) *Attorney, Agent, or Firm* — Bayramoglu Law Offices LLC

(57) ABSTRACT

A Deepfake detection method based on identity and face shape features is provided. The Deepfake detection method combines an identity feature with a three-dimensional (3D) face shape feature, and designs a face shape consistency self-attention (FSCA) module and an identity guided shape consistency attention (IGSCA) module to mine an identity and face shape inconsistency feature. The Deepfake detection method achieves strong targeting performance based on reference face information of different faces, and additionally utilizes a reference face to assist in detecting a target face, achieving strong targeting performance. The Deepfake
(Continued)

detection method combines identity and shape features to achieve good generalized detection performance, improving Deepfake detection performance and accuracy.

10 Claims, 4 Drawing Sheets

(58) Field of Classification Search
USPC .......................................................... 382/118
See application file for complete search history.

(56) References Cited

FOREIGN PATENT DOCUMENTS

| | | | |
|---|---|---|---|
| CN | 113435292 | A | 9/2021 |
| CN | 114093013 | A | 2/2022 |
| CN | 114694220 | A | 7/2022 |
| CN | 115512448 | A | 12/2022 |
| CN | 116434351 | A | 7/2023 |
| CN | 116453199 | A | 7/2023 |
| CN | 116612211 | A | 8/2023 |
| WO | 2022161286 | A1 | 8/2022 |

OTHER PUBLICATIONS

Thanh Thi Nguyena, et al., Deep Learning for Deepfakes Creation and Detection: A Survey, 2022, pp. 1-19.

Asad Malik, et al., DeepFake Detection for Human Face Images and Videos: A Survey, IEEE, Access, 2022, pp. 18757-18775, vol. 10.

Chunlei Peng, et al., Deep visual identity forgery and detection, Scientia Sinica Informationis, 2021, pp. 1451-1474, vol. 51 No. 9.

Li Haoran, Research on Identity Recognition Based on Dynamic Lip Features, Electronic Science and Engineering Southeast University, 2021, pp. 1-66.

Xie Fei, Research on Deepfake image detection based on deep learning to integrate multi-dimensional recognition features, People's Public Security University of China, 2023, pp. 1-92.

Yang Shaocong, et al., Multi-level features global consistency for human facial deepfake detection, Journal of Image and Graphics, 2022, vol. 27 No. 9.

Jiseob Kim, et al., Smooth-Swap: A Simple Enhancement for Face-Swapping with Smoothness, CVF, pp. 10779-10788.

* cited by examiner

Face Shape Consistency Self-Attention Module

DEEPFAKE DETECTION METHOD BASED ON IDENTITY AND FACE SHAPE FEATURES

CROSS-REFERENCE TO THE RELATED APPLICATIONS

This application is based upon and claims priority to Chinese Patent Application No. 202311546911.X, filed on Nov. 20, 2023, the entire contents of which are incorporated herein by reference.

TECHNICAL FIELD

The present disclosure relates to the technical field of Deepfake detection, and in particular to a Deepfake detection method based on identity and face shape features.

BACKGROUND

In recent years, with the continuous development of Deepfake technology, even the general public can change the identity of images through some open-source methods, making it hard for ordinary people to distinguish authenticity. The Deepfake technology can be used for entertainment and film and television production projects, etc., but it can also be used for illegal purposes such as malicious dissemination and online fraud, causing negative effects.

Traditional Deepfake detection methods directly consider the problem of Deepfake detection as a binary classification problem, and directly classify real and fake images through backbone networks, with average detection performance. Later methods often capture forged traces left by the generator through carefully designed modules, resulting in poor generalization performance. In practical applications, the detection performance of model fitting and specific methods for the faces that are generated by unknown faking methods sharply decreases.

SUMMARY

In order to overcome the above-mentioned shortcomings in the prior art, the present disclosure provides a Deepfake detection method based on identity and face shape features, which achieves strong targeting performance for face detection.

In order to solve the technical problem, the present disclosure adopts the following technical solution.

The Deepfake detection method based on identity and face shape features includes the following steps:

a) acquiring videos to form a training set and a test set, extracting a tensor $X_{train}$ from the training set, and extracting tensors $$X'_{test} \text{ and } X'_{ref}$$

from the test set;

b) inputting the tensor $X_{train}$ into an identity encoder to acquire a facial identity feature $$F_{id}^{n};$$

c) constructing an identity feature consistency network, including a three-dimensional (3D) reconstruction encoder, an identity and face shape consistency extraction network, and a fusion unit;

d) inputting the tensor $X_{train}$ into the 3D reconstruction encoder of the identity feature consistency network to acquire a face shape feature $F_{shape}$ e) inputting the feature $F_{shape}$ and the facial identity feature $$F_{id}^{n}$$

into the identity and face shape consistency extraction network of the identity feature consistency network to acquire an identity and face shape consistency feature $F_{ISC}$ f) inputting the facial identity feature $$F_{id}^{n}$$

and the identity and face shape consistency feature $F_{ISC}$ into the fusion unit of the identity feature consistency network for fusing to acquire a feature $F_{IC}$;

g) calculating a loss function L, and training the identity feature consistency network through the loss function L to acquire an optimized identity feature consistency network; and h) inputting the tensor $$X'_{test}$$

into the optimized identity feature consistency network test to acquire a feature $$F'_{IC};$$

inputting $$X'_{ref}$$

into the optimized identity feature consistency network to acquire a feature $$F''_{IC};$$

and calculating a similarity value S by $$s = \delta(F'_{IC}, F''_{IC}),$$

where $\delta(\cdot,\cdot)$ denotes a cosine similarity calculation function; determining that a face in a video is a real face if the similarity value S is greater than or equal to a threshold $\tau$; and determining that the face in the video is a fake face if the similarity value S is less than $\tau$.

Further, the step a) includes:

a-1) acquiring, from a facial forgery dataset FaceForensics++, N videos as the training set $V_{train}$ and M videos as the test set $V_{test}$, where $V_{train}=V_F+V_R=\{V_1,V_2, \ldots ,V_n, \ldots ,V_N\}$; the trainingset includes $N_F$ fakevideos and $N_R$ real videos, $N_F+N_R=N$; $V_F$ denotes a fake video set, and $V_R$ denotes a real video set; $V_n$ denotes an n-th video, $n\in\{1, \ldots , N\}$; the n-th video V includes L image frames, $V_n=x_1, x_2, \ldots , x_j, \ldots , x_L\}$; $X_i$ denotes a j-th image frame, $j\in\{1, \ldots ,L\}$, and $X_j$ corresponds to a class label $y_j$; when the j-th image frame $X_j$ is a real image, $X_j$ is 0; when the j-th image frame $x_j$ is a fake image, $X_1$ is 1; the j-th image frame $X_j$ corresponds to a source identity label $$y_j^s;$$

$$V_{test} = V_F' + V_R' = \{V_1', V_2', \ldots , V_m', \ldots , V_M'\};$$

the test set includes $M_F$ fake videos and $M_R$ real videos, $M_F+M_R=M$;

$$V_F'$$

denotes a fake video set, and $$V_R'$$

denotes a real video set; and $$V_m'$$

denotes an m-th video, $m\in\{1, \ldots , M\}$;

a-2) reading, by VideoReader in opencv, the n-th video $V_n$ in the training set frame by frame; randomly extracting T consecutive video frames from the n-th video $V_n$ as a training video $V_{train}$; detecting, by a multi-task cascaded convolutional network (MTCNN) algorithm, a facial keypoint in each video frame of the training video $V_{train}$, and calibrating a facial image; and cutting a calibrated facial image to form a facial image matrix $$X_{train}';$$

a-3) reading, by VideoReader in opencv, the m-th video $$V_m'$$

of the fake video set $$V_F'$$

in the test set frame by frame; and randomly extracting T consecutive video frames from the m-th video $$V_m'$$

as a test video $V_{test\_1}$; reading, by VideoReader in opencv, the m-th video $$V_m'$$

of the real video set $$V_R'$$

in the test set frame by frame; randomly extracting two sets of T consecutive video frames from the m-th video $$V_m',$$

where a first set of consecutive video frames forms a test video $V_{test\_2}$ and a second set of consecutive video frames forms a reference video $V_{ref}$; acquiring a test video $V_{test}$ by $V_{test}=V_{test\_1}+V_{test\_2}$; detecting, by the MTCNN algorithm, a facial keypoint in each video frame of the test video $V_{test}$, and calibrating a facial image; cutting a calibrated facial image to form a facial image matrix $$X_{test}';$$

detecting, by the MTCNN algorithm, a facial keypoint in each video frame of the reference video $V_{ref}$, and calibrating a facial image; and cutting a calibrated facial image to form a facial image matrix $$X_{ref}';$$

and a-4) transposing, by a ToTensor( ) function in PyTorch, the facial image matrix $$X_{train}'$$

into the tensor $X_{train}$, $X_{train}\in R^{T\times C\times H\times W}$, transposing the facial image matrix $$X_{test}'$$

into the tensor $X_{test}$, $X_{test}\in R^{T\times C\times H\times W}$, and transposing the facial image matrix $$X'_{ref}$$

into the tensor $X_{ref}$, $X_{ref} \in R^{T \times C \times H \times W}$ where R denotes a real number space, C denotes a channel number of the image frame, H denotes a height of the image frame, and W denotes a width of the image frame.

Further, the step b) includes: constructing the identity encoder, including an additive angular margin loss (ArcFace) face recognition model; inputting the tensor $X_{train}$ into the identity encoder to acquire an identity feature $$F'_{id}$$

of the n-th video $V_n$ in the training set, $$F'_{id} \in R^{T \times 512};$$

and transposing, by a tensor.transpose( ) function in PyTorch, the identity feature $$F'_{id}$$

into the facial identity feature $$F^n_{id}$$

of the n-th video $V_n$ in the training set, $$F^n_{id} \in R^{512 \times T},$$

$n \in \{1, \ldots, N\}$.

Further, the step d) includes:

d-1) constructing the 3D reconstruction encoder of the identity feature consistency network, including a pre-trained Deep3DFaceRecon network;

d-2) inputting the tensor $X_{train}$ into the 3D reconstruction encoder to acquire a 3D morphable model (3DMM) identity feature $$F'_{shape};$$

and d-3) transposing, by the tensor.transpose( ) function in PyTorch, the 3DMM identity feature $$F'_{shape}$$

into the face shape feature $F_{shape}$, $F_{shape} \in R^{257 \times T}$.

Further, the step e) includes:

e-1) constructing the identity and face shape consistency extraction network of the identity feature consistency network, including a face shape consistency self-attention (FSCA) module and an identity guided shape consistency attention (IGSCA) module;

e-2) constructing the FSCA module of the identity and face shape consistency extraction network, including a temporal convolutional block, a first residual convolutional block, a second residual convolutional block, a third residual convolutional block, a first self-attention block, a second self-attention block, a third self-attention block, and a fourth self-attention block;

e-3) constructing the temporal convolutional block of the FSCA module, including a one-dimensional (1D) convolutional layer, a layer normalization (LayerNorm) layer, and a leaky rectified linear unit (LeakeyReLU) function; inputting the face shape feature $F_{shape}$ into the 1D convolutional layer to acquire a feature $$F^{1-1}_{shape};$$

inputting the feature $$F^{1-1}_{shape}$$

into the LayerNorm layer to acquire a feature $$F^{1-2}_{shape};$$

and inputting the feature $$F^{1-2}_{shape}$$

into the LeakeyReLU function to acquire a feature $$F^{1}_{shape}, F^{1}_{shape} \in R^{512 \times T};$$

e-4) constructing the first residual convolutional block, the second residual convolutional block, and the third residual convolutional block of the FSCA module, each including a ID convolutional layer, a LayerNorm layer, and a LeakeyReLU function; inputting the feature $$F^{1}_{shape}$$

into the 1D convolutional layer of the first residual convolutional block to acquire a feature $$F^{2-1}_{shape},$$

inputting the feature $$F^{2-1}_{shape}$$

into the LayerNorm layer of the first residual convolutional block to acquire a feature $$F_{shape}^{2-2},$$

inputting the feature $$F_{shape}^{2-2}$$

into the LeakeyReLU function of the first residual convolutional block to acquire a feature $$F_{shape}^{2-3},$$

and adding the feature $$F_{shape}^{1}$$

to the feature $$F_{shape}^{2-3}$$

to acquire a feature $$F_{shape}^{2};$$

inputting the feature $$F_{shape}^{2}$$

into the 1D convolutional layer of the second residual convolutional block to acquire a feature $$F_{shape}^{3-1},$$

inputting the feature $$F_{shape}^{3-1}$$

into the LayerNorm layer of the second residual convolutional block to acquire a feature $$F_{shape}^{3-2},$$

inputting the feature $$F_{shape}^{3-2}$$

into the LeakeyReLU function of the second residual convolutional block to acquire a feature $$F_{shape}^{3-3},$$

and adding the feature $$F_{shape}^{2}$$

to the feature $$F_{shape}^{3-3}$$

to acquire a feature $$F_{shape}^{3};$$

and inputting the feature $$F_{shape}^{3}$$

into the 1D convolutional layer of the third residual convolutional block to acquire a feature $$F_{shape}^{4-1},$$

inputting the feature $$F_{shape}^{4-1}$$

into the LayerNorm layer of the third residual convolutional block to acquire a feature $$F_{shape}^{4-2},$$

inputting the feature $$F_{shape}^{4-2}$$

into the LeakeyReLU function of the third residual convolutional block to acquire a feature $$F_{shape}^{4-3},$$

and adding the feature $$F_{shape}^{3}$$

to the feature $$F_{shape}^{4-3}$$

to acquire a feature $$F_{shape}^{4};$$

e-5) constructing the first self-attention block, the second self-attention block, the third self-attention block, and the fourth self-attention block of the FSCA module, each including a multi-head attention mechanism and a LayerNorm layer; transposing, by the tensor.transpose( ) function in PyTorch, the feature $$F_{shape}^{4}$$

into a feature $$F_{shape}'^{4}, F_{shape}'^{4} \in R^{T \times 512};$$

inputting the feature $$F_{shape}'^{4}$$

into the multi-head attention mechanism of the first self-attention block to acquire a feature $$F_{shape}^{5-1},$$

inputting the feature $$F_{shape}^{5-1}$$

into the LayerNorm layer of the first self-attention block to acquire a feature $$F_{shape}'^{5-1},$$

and adding the feature $$F_{shape}'^{5-1}$$

to the feature $$F_{shape}'^{4}$$

to acquire a feature $$F_{shape}^{5};$$

inputting the feature $$F_{shape}^{5}$$

into the multi-head attention mechanism of the second self-attention block to acquire a feature $$F_{shape}^{6-1},$$

inputting the feature $$F_{shape}^{6-1}$$

into the LayerNorm layer of the second self-attention block to acquire a feature $$F_{shape}'^{6-1},$$

and adding the feature $$F_{shape}'^{6-1}$$

to the feature $$F_{shape}^{5}$$

to acquire a feature $$F_{shape}^{6};$$

inputting the feature $$F_{shape}^{6}$$

into the multi-head attention mechanism of the third self-attention block to acquire a feature $$F_{shape}^{7-1},$$

inputting the feature $$F_{shape}^{7-1}$$

into the LayerNorm layer of the third self-attention block to acquire a feature $$F'^{7-1}_{shape},$$

and adding the feature $$F'^{7-1}_{shape}$$

to the feature $$F_{shape}^{6}$$

to acquire a feature $$F_{shape}^{7};$$

and inputting the feature $$F_{shape}^{7}$$

into the multi-head attention mechanism of the fourth self-attention block to acquire a feature $$F_{shape}^{8-1},$$

inputting the feature $$F_{shape}^{8-1}$$

into the LayerNorm layer of the fourth self-attention block to acquire a feature $$F'^{8-1}_{shape},$$

and adding the feature $$F'^{8-1}_{shape}$$

to the feature $$F_{shape}^{7}$$

to acquire a feature $$F_{shape}^{8}, F_{shape}^{8} \in R^{T\times 512};$$

e-6) constructing the IGSCA module of the identity feature consistency network, including an identity feature mapping block, a first cross attention block (CAB), a second CAB, a third CAB, a fourth CAB, a first dilated convolutional block, a second dilated convolutional block, a third dilated convolutional block, a fourth dilated convolutional block, and a fifth dilated convolutional block;

e-7) constructing the identity feature mapping block of the IGSCA module, including a ID convolutional layer, a LayerNorm layer, and a LeakeyReLU function; inputting the facial identity feature $$F_{id}^{n}$$

into the ID convolutional layer of the identity feature mapping block to acquire a feature $$F_{id}^{1-1};$$

inputting the feature $$F_{id}^{1-1}$$

into the LayerNorm layer of the identity feature mapping block to acquire a $$F_{id}^{1-2};$$

inputting the feature $$F_{id}^{1-2}$$

into the LeakeyReLU function of the identity feature mapping block to acquire a feature $$F_{id}^{1-3};$$

and transposing, by the tensor.transpose( ) function in PyTorch, the feature $$F_{id}^{1-3}$$

into a feature $$F_{id}^{1}, F_{id}^{1} \in R^{T\times 512};$$

e-8) constructing the first CAB, the second CAB, the third CAB, and the fourth CAB of the IGSCA module, each including a multi-head attention mechanism, a LayerNorm layer, and a LeakeyReLU function; performing a linear transformation on the feature $$F_{id}^{1}$$

to acquire a value of query in the multi-head attention mechanism of the first CAB; performing a linear transformation on the feature $$F_{shape}^{8}$$

to acquire values of key and value in the multi-head attention mechanism of the first CAB, thereby acquiring an output feature $$F_{shape}^{9-1}$$

of the multi-head attention mechanism in the first CAB; inputting the feature $$F_{shape}^{9-1}$$

into the LayerNorm layer of the first CAB to acquire a feature $$F'^{9-1}_{shape};$$

adding the feature $$F'^{9-1}_{shape}$$

to the feature $$F_{shape}^{8}$$

to acquire a feature $$F_{shape}^{9};$$

performing a linear transformation on the feature $$F_{id}^{1}$$

to acquire a value of query in the multi-head attention mechanism of the second CAB; performing a linear transformation on the feature $$F_{shape}^{9}$$

to acquire values of key and value in the multi-head attention mechanism of the second CAB, thereby acquiring an output feature $$F_{shape}^{10-1}$$

of the multi-head attention mechanism in the second CAB; inputting the feature $$F_{shape}^{10-1}$$

into the LayerNorm layer of the second CAB to acquire a feature $$F'^{10-1}_{shape};$$

adding the feature $$F'^{10-1}_{shape}$$

to the feature $$F_{shape}^{9}$$

to acquire a feature $$F_{shape}^{10};$$

performing a linear transformation on the feature $$F_{id}^{1}$$

to acquire a value of query in the multi-head attention mechanism of the third CAB; performing a linear transformation on the feature $$F_{shape}^{10}$$

to acquire values of key and value in the multi-head attention mechanism of the third CAB, thereby acquiring an output feature $$F_{shape}^{11-1}$$

of the multi-head attention mechanism in the third CAB; inputting the feature $$F_{shape}^{11-1}$$

into the LayerNorm layer of the third CAB to acquire a feature $$F_{shape}^{\prime 11-1};$$

adding the feature $$F_{shape}^{\prime 11-1}$$

to the feature $$F_{shape}^{10}$$

to acquire a feature $$F_{shape}^{11};$$

performing a linear transformation on the feature $$F_{id}^{1}$$

to acquire a value of query in the multi-head attention mechanism of the fourth CAB; performing a linear transformation on the feature $$F_{shape}^{11}$$

to acquire values of key and value in the multi-head attention mechanism of the fourth CAB, thereby acquiring an output feature $$F_{shape}^{12-1}$$

of the multi-head attention mechanism in the fourth CAB; inputting the feature $$F_{shape}^{12-1}$$

into the LayerNorm layer of the fourth CAB to acquire a feature $$F_{shape}^{\prime 12-1};$$

and adding the feature $$F_{shape}^{\prime 12-1}$$

to the feature $$F_{shape}^{11}$$

to acquire a feature $$F_{shape}^{12};$$

and e-9) constructing the first dilated convolutional block, the second dilated convolutional block, the third dilated convolutional block, the fourth dilated convolutional block, and the fifth dilated convolutional block of the IGSCA module, each including a dilated convolutional layer, a group normalization (GroupNorm) layer, and a LeakeyReLU function; inputting the feature $$F_{shape}^{12}$$

into the dilated convolutional layer of the first dilated shape convolutional block to acquire a feature $$F_{shape}^{13-1},$$

inputting the feature $$F_{shape}^{13-1}$$

into the GroupNorm layer of the first dilated convolutional block to acquire a feature $$F_{shape}^{13-2},$$

inputting the feature $$F_{shape}^{13-2}$$

into the LeakeyReLU function of the first dilated convolutional block to acquire a feature $$F'^{13-2}_{shape},$$

and adding the feature $$F'^{13-2}_{shape}$$

to the feature $$F^{12}_{shape}$$

to acquire a feature $$F^{13}_{shape};$$

inputting the feature $$F^{13}_{shape}$$

into the dilated convolutional layer of the second dilated convolutional block to acquire a feature $$F^{14-1}_{shape},$$

inputting the feature $$F^{14-1}_{shape}$$

into the GroupNorm layer of the second dilated convolutional block to acquire a feature $$F^{14-2}_{shape},$$

inputting the feature $$F^{14-2}_{shape}$$

into the LeakeyReLU function of the second dilated convolutional block to acquire a feature $$F'^{14-2}_{shape},$$

and adding the feature $$F'^{14-2}_{shape}$$

to the feature $$F^{13}_{shape}$$

to acquire a feature $$F^{14}_{shape};$$

inputting the feature $$F^{14}_{shape}$$

into the dilated convolutional layer of the third dilated convolutional block to acquire a feature $$F^{15-1}_{shape},$$

inputting the feature $$F^{15-1}_{shape}$$

into the GroupNorm layer of the third dilated convolutional block to acquire a feature $$F^{15-2}_{shape},$$

inputting the feature $$F^{15-2}_{shape}$$

into the LeakeyReLU function of the third dilated convolutional block to acquire a feature $$F'^{15-2}_{shape},$$

and adding the feature $$F'^{15-2}_{shape}$$

to the feature $$F^{14}_{shape}$$

to acquire a feature $$F_{shape}^{15};$$

inputting the feature $$F_{shape}^{15}$$

into the dilated convolutional layer of the fourth dilated convolutional block to acquire a feature $$F_{shape}^{16-1},$$

inputting the feature $$F_{shape}^{16-1}$$

into the GroupNorm layer of the fourth dilated convolutional block to acquire a feature $$F_{shape}^{16-2},$$

inputting the feature $$F_{shape}^{16-2}$$

into the LeakeyReLU function of the fourth dilated convolutional block to acquire a feature $$F_{shape}'^{16-2},$$

and adding the feature $$F_{shape}'^{16-2}$$

to the feature $$F_{shape}^{15}$$

to acquire a feature $$F_{shape}^{16};$$

and inputting the feature $$F_{shape}^{16}$$

into the dilated convolutional layer of the fifth dilated shape convolutional block to acquire a feature $$F_{shape}^{17-1},$$

inputting the feature $$F_{shape}^{17-1}$$

into the GroupNorm layer of the fifth dilated convolutional block to acquire a feature $$F_{shape}^{17-2},$$

inputting the feature $$F_{shape}^{17-2}$$

into the LeakeyReLU function of the fifth dilated convolutional block to acquire a feature $$F_{shape}'^{17-2},$$

and adding the feature $$F_{shape}'^{17-2}$$

to the feature $$F_{shape}^{16}$$

to acquire the identity and face shape consistency feature $F_{ISC}$, $F_{ISC} \in R^{512}$ Preferably, in the step e-3), the 1D convolutional layer of the temporal convolutional block includes a convolution kernel with a size of 1, a stride of 2, and a padding of 0; in the step e-4), the 1D convolutional layer of each of the first residual convolutional block, the second residual convolutional block, and the third residual convolutional block includes a convolution kernel with a size of 1, a stride of 2, and a padding of 0; in the step e-5), the multi-head attention mechanism of each of the first self-attention block, the second self-attention block, the third self-attention block, and the fourth self-attention block includes 6 heads; in the step e-7), the 1D convolutional layer of the identity feature mapping block includes a convolution kernel with a size of 3, a stride of 1, and a padding of 1; in the step e-8), the multi-head attention mechanism of each of the first CAB, the second CAB, the third CAB, and the fourth CAB includes 8 heads; in the step c-9), the dilated convolutional layer of each of the first dilated convolutional block and the second dilated convolutional block includes a convolution kernel with a size of 3, a stride of 1, a padding of 0, and a dilation factor of 2; the dilated convolutional layer of each of the third dilated convolutional block, the fourth dilated convolutional block, and the fifth dilated convolutional block includes a convolution kernel with a size of 3, a stride of 1, a padding of 0, and a dilation factor of 4; and the GroupNorm layer of each of the first dilated convolutional block, the second dilated convolutional block, the third dilated convolutional block, the fourth dilated convolutional block, and the fifth dilated convolutional block has a group size of 16.

Further, the step f) includes:

f-1) inputting the facial identity $$F_{id}^{n}$$

into the fusion unit of the identity feature consistency network; and calculating, by a torch.mean( ) function in PyTorch, a mean of the facial identity feature $$F_{id}^{n}$$

to acquire an identity feature $$F_{id}^{2},\ F_{id}^{2} \in R^{512};$$

and f-2) concatenating, by a torch.concat( ) function in PyTorch, the identity feature $$F_{id}^{2}$$

with the identity and face shape consistency feature $F_{ISC}$ to acquire the feature $F_{IC}$ Further, the step g) includes:

g-1) calculating the loss function L by $L=\eta L_{sid}+\lambda L(f_{emb})$, where $\eta$ and $\lambda$ are scaling factors; $L_{sid}$ denotes an embedding optimization loss of a fake identity; $L(f_{emb})$ denotes a supervised contrastive learning loss;

$$L_{sid} = \frac{1}{N_F} 1\{y_i^s = y_j^s\} \sum_{i \in N_F} \delta(F_{id}^{i}, F_{id}^{j}) - \frac{1}{N_R} 1\{y_i^s = y_j^s\} \sum_{i \in N_R} \delta(F_{id}^{i}, F_{id}^{j});$$

$$1\{y_i^s = y_j^s\}$$

indicates that a value of 1 is taken when $$y_i^s$$

equals $$y_j^s$$

and a value of 0 is taken when $$y_i^s$$

is not equal to $$y_j^s;\ y_i^s$$

denotes the source identity label of the i-th image frame $X_i$, $i \in \{1, \ldots, L\}$; $\delta(\cdot,\cdot)$ denotes the cosine similarity calculation function;

$$F_{id}^{i}$$

denotes a facial identity feature of an i-th video $V_i$ in the training set, $i \in \{1, \ldots, N\}$; and $$F_{id}^{j}$$

denotes a facial identity feature of a j-th video $V_j$ in the training set, $j \in \{1, \ldots, N\}$; and g-2) training, by an adaptive moment estimation (Adam) optimizer, the identity feature consistency network through the loss function L to acquire the optimized identity feature consistency network.

Preferably, $\eta$ is 0.2, and $\lambda$ is 0.8.

Preferably, in the step h), $\tau \in (0,1)$.

The present disclosure has the following beneficial effects. The present disclosure combines an identity feature with a 3D face shape feature, and designs the FSCA and the IGSCA module to mine an identity and face shape inconsistency feature. The present disclosure achieves strong targeting performance based on reference face information for detecting different faces, and achieves strong generalized detection performance based on the identity and face shape information of the reference face, improving face detection performance and accuracy.

DETAILED DESCRIPTION OF THE EMBODIMENTS

Figure 1:
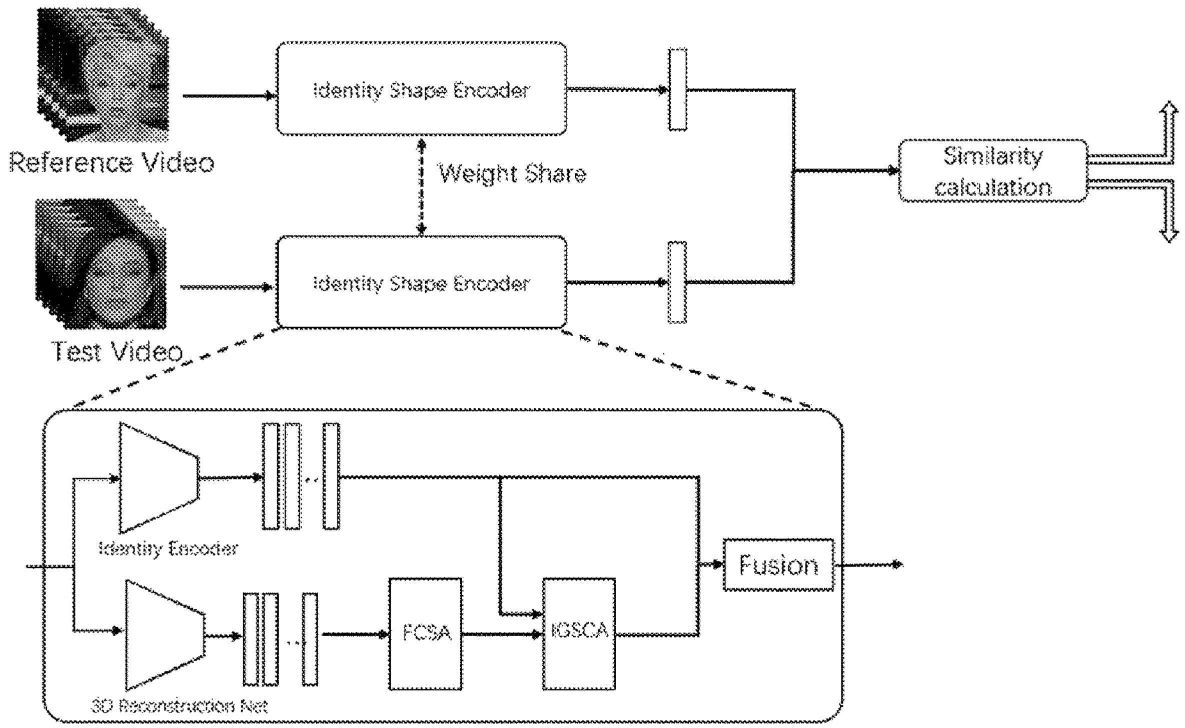
FIG. 1 is a flowchart of a Deepfake detection method based on identity and face shape features according to the present disclosure.
Figure 2:
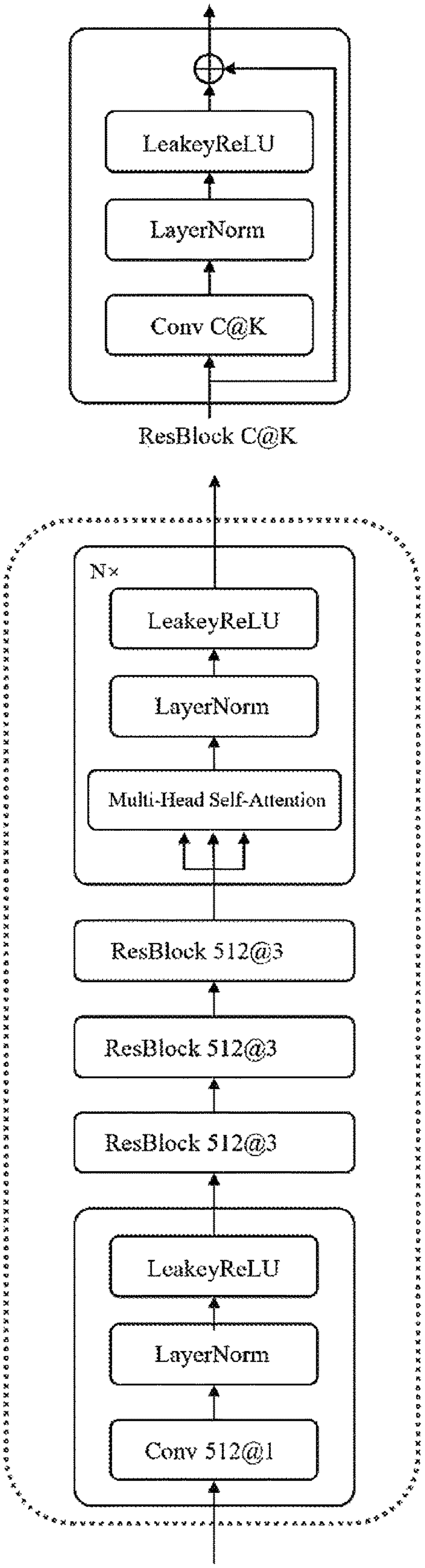
FIG. 2 is a structural diagram of a face shape consistency self-attention (FSCA) module according to the present disclosure.
Figure 3:
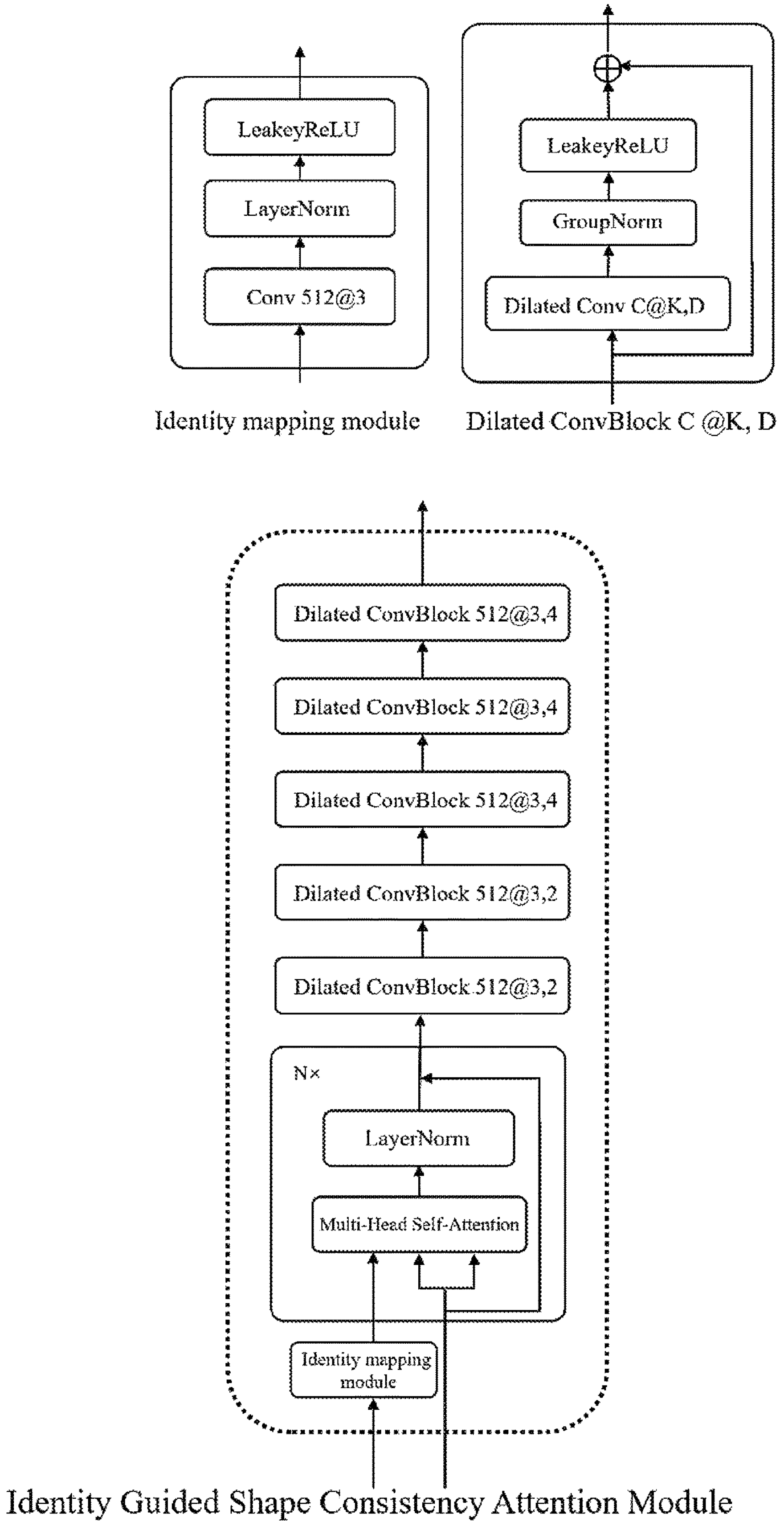
FIG. 3 is a structural diagram of an identity guided shape consistency attention (IGSCA) module according to the present disclosure.

The present disclosure is further described below with reference to FIGS. 1, 2, and 3.

A Deepfake detection method based on identity and face shape features includes the following steps.

a) Videos are acquired to form a training set and a test set. Tensor $X_{train}$ is extracted from the training set, and tensors $$X'_{test} \text{ and } X'_{ref}$$

are extracted from the test set.

b) The tensor $X_{train}$ is input into an identity encoder to acquire facial identity feature $$F^n_{id}.$$

c) An identity feature consistency network is constructed, including a three-dimensional (3D) reconstruction encoder, an identity and face shape consistency extraction network, and a fusion unit.

d) The tensor $X_{train}$ is input into the 3D reconstruction encoder of the identity feature consistency network to acquire face shape feature $F_{shape}$.

e) The feature $F_{shape}$ and the facial identity feature $$F^n_{id}$$

are input into the identity and face shape consistency extraction network of the identity feature consistency network to acquire identity and face shape consistency feature $F_{ISC}$ f) The facial identity feature $$F^n_{id}$$

and the identity and face shape consistency feature $F_{ISC}$ are input into the fusion unit of the identity feature consistency network for fusing to acquire feature $F_{IC}$.

g) Loss function L is calculated, and the identity feature consistency network is trained through the loss function L to acquire an optimized identity feature consistency network.

h) The tensor $$X'_{test}$$

is input into the optimized identity feature consistency network test to acquire feature $$F'_{IC}.$$

$$X'_{ref}$$

is input into the optimized identity feature consistency network to acquire feature $$F''_{IC}.$$

Similarity value S is calculated by $$s = \delta(F'_{IC}, F''_{IC}),$$

where $\delta(\cdot,\cdot)$ denotes a cosine similarity calculation function. It is determined that a face in a video is a real face if the similarity value S is greater than or equal to a threshold $\tau$, and it is determined that the face in the video is a fake face if the similarity value S is less than $\tau$. Specifically, $\tau \in (0,1)$.

The present disclosure provides a Deepfake detection method that combines a facial identity vector feature and a face shape feature, achieving strong targeting performance and good generalization performance for face detection.

In an embodiment of the present disclosure, the step a) is as follows.

a-1) N videos are acquired from a facial forgery dataset FaceForensics++ as the training set $V_{train}$ and M videos are acquired as the test set $V_{test}$. $V_{train}=V_F+V_R=\{V_1, V_2, \ldots, V_n, \ldots, V_N\}$. The training set includes $N_F$ fake videos and $N_R$ real videos, $N_F+N_R=N$. $V_F$ denotes a fake video set, and $V_R$ denotes a real video set. $V_n$ denotes an n-th video, $n \in \{1, \ldots, N\}$. The n-th video $V_n$ includes L image frames, $V_n=\{X_1, X_2, \ldots, X_j, \ldots, X_L\}$. $X_j$ denotes a j-th image frame, $j \in \{1, \ldots, L\}$, and $X_j$ corresponds to class label $y_j$. When the j-th image frame $x_j$ is a real image, $X_j$ is 0. When the j-th image frame $x_j$ is a fake image, $X_j$ is 1. The j-th image frame $X_j$ corresponds to source identity label $$y^s_j \cdot V_{test} = V'_F + V'_R = \{V'_1, V'_2, \ldots, V'_m, \ldots, V'_M\}.$$

The test set includes $M_F$ fake videos and $M_R$ real videos, $M_F+M_R=M$.

$$V'_F$$

denotes a fake video set, and $$V'_R$$

denotes a real video set.

$$V'_m$$

denotes an m-th video, $m \in \{1, \ldots, M\}$.

a-2) The n-th video $V_n$ in the training set is read by VideoReader in opencv frame by frame. T consecutive video frames are randomly extracted from the n-th video $V_n$ as training video $V_{train}$. A facial keypoint in each video frame of the training video $V_{train}$ is detected by a multi-task cascaded convolutional network (MTCNN) algorithm, and a facial image is calibrated. A calibrated facial image is cut to form facial image matrix $$X'_{train}.$$

a-3) The m-th video $$V'_m$$

of the fake video set $$V'_F$$

in the test set frame is read by VideoReader in opencv by frame. T consecutive video frames are randomly extracted from the m-th video $$V'_m$$

as test video $V_{test\_1}$. The m-th video $$V'_m$$

of the real video set $$V'_R$$

in the test set is read by VideoReader in opencv frame by frame. Two sets of T consecutive video frames are randomly extracted from the m-th video $$V'_m,$$

where a first set of consecutive video frames forms test video $V_{test\_2}$, and a second set of consecutive video frames forms reference video $V_{ref}$. Test video $V_{test}$ is acquired by $V_{test}=V_{test\_1}+V_{test\_2}$. A facial keypoint in each video frame of the test video $V_{test}$ is detected by the MTCNN algorithm, and a facial image is calibrated. A calibrated facial image is cut to form facial image matrix $$X'_{test}.$$

A facial keypoint in each video frame of the reference video $V_{ref}$ is detected by the MTCNN algorithm, and a facial image is calibrated. A calibrated facial image is cut to form facial image matrix $$X'_{ref}.$$

a-4) The facial image matrix $$X'_{train}$$

is transposed by a ToTensor( ) function in PyTorch into the tensor $X_{train}$, $X_{train} \in R^{T \times C \times H \times W}$. The facial image matrix $$X'_{test}$$

is transposed into the tensor $X_{test}$, $X_{test} \in R^{T \times C \times H \times W}$. The facial image matrix $$X'_{ref}$$

is transposed into the tensor $X_{ref}$, $X_{ref} \in R^{T \times C \times H \times W}$. R denotes a real number space, C denotes a channel number of the image frame, H denotes a height of the image frame, and W denotes a width of the image frame.

In an embodiment of the present disclosure, in the step b), the identity encoder is constructed, including an additive angular margin loss (ArcFace) face recognition model. The tensor $X_{train}$ is input into the identity encoder to acquire identity feature $$F'_{id}$$

of the n-th video $V_n$ in the training set, $$F'_{id} \in R^{T \times 512},$$

R being a real number space. The identity feature $$F'_{id}$$

is transposed by a tensor.transpose( ) function in PyTorch into the facial identity feature $$F^n_{id}$$

of the n-th video $V_n$ in the training set, $$F^n_{id} \in R^{512 \times T},$$

$n \in \{1, \ldots, N\}$.

In an embodiment of the present disclosure, the step d) is as follows.

d-1) The 3D reconstruction encoder of the identity feature consistency network is constructed, including a pre-trained Deep3DFaceRecon network.

d-2) The tensor $X_{train}$ is input into the 3D reconstruction encoder to acquire 3D morphable model (3DMM) identity feature $$F'_{shape}.$$

d-3) The 3DMM identity feature $$F'_{shape}$$

is transposed by the tensor.transpose( ) function in PyTorch into the face shape feature $F_{shape}$, $F_{shape} \in R^{257 \times T}$.

In an embodiment of the present disclosure, the step e) is as follows.

e-1) The identity and face shape consistency extraction network of the identity feature consistency network is constructed, including a face shape consistency self-attention (FSCA) module and an identity guided shape consistency attention (IGSCA) module.

e-2) The FSCA module of the identity and face shape consistency extraction network is constructed, including a temporal convolutional block, a first residual convolutional block, a second residual convolutional block, a third residual convolutional block, a first self-attention block, a second self-attention block, a third self-attention block, and a fourth self-attention block.

e-3) The temporal convolutional block of the FSCA module is constructed, including a one-dimensional (1D) convolutional layer, a layer normalization (LayerNorm) layer, and a leaky rectified linear unit (LeakeyReLU) function. The face shape feature $F_{shape}$ is input is input into the 1D convolutional layer to acquire feature $$F_{shape}^{1-1}.$$

The feature $$F_{shape}^{1-1}$$

is input into the LayerNorm layer to acquire feature $$F_{shape}^{1-2}.$$

The feature $$F_{shape}^{1-2}$$

is input into the LeakeyReLU function to acquire feature $$F_{shape}^{1}, F_{shape}^{1} \in R^{512 \times T}.$$

e-4) The first residual convolutional block, the second residual convolutional block, and the third residual convolutional block of the FSCA module are constructed, each including a ID convolutional layer, a LayerNorm layer, and a LeakeyReLU function. The feature $$F_{shape}^{1}$$

is input into the 1D convolutional layer of the first residual convolutional block to acquire feature $$F_{shape}^{2-1},$$

the feature $$F_{shape}^{2-1}$$

is input into the LayerNorm layer of the first residual convolutional block to acquire feature $$F_{shape}^{2-2},$$

the feature $$F_{shape}^{2-2}$$

is input into the LeakeyReLU function of the first residual convolutional block to acquire feature $$F_{shape}^{2-3},$$

and the feature $$F_{shape}^{1}$$

is added to the feature $$F_{shape}^{2-3}$$

to acquire feature $$F_{shape}^{2}.$$

The feature $$F_{shape}^{2}$$

is input into the 1D convolutional layer of the second residual convolutional block to acquire feature $$F_{shape}^{3-1},$$

the feature $$F_{shape}^{3-1}$$

is input into the LayerNorm layer of the second residual convolutional block to acquire feature $$F_{shape}^{3-2},$$

the feature $$F_{shape}^{3-2}$$

is input into the LeakeyReLU function of the second residual convolutional block to acquire feature $$F_{shape}^{3-3},$$

and the feature $$F_{shape}^{2}$$

is added to the feature $$F_{shape}^{3-3}$$

to acquire feature $$F_{shape}^{3}.$$

The feature $$F_{shape}^{3}$$

is input into the 1D convolutional layer of the third residual convolutional block to acquire feature $$F_{shape}^{4-1},$$

the feature $$F_{shape}^{4-1}$$

is input into the LayerNorm layer of the third residual convolutional block to acquire feature $$F_{shape}^{4-2},$$

the feature $$F_{shape}^{4-2}$$

is input into the LeakeyReLU function of the third residual convolutional block to acquire feature $$F_{shape}^{4-3},$$

and the feature $$F_{shape}^{3}$$

is added to the feature $$F_{shape}^{4-3}$$

to acquire feature $$F_{shape}^{4}.$$

e-5) The first self-attention block, the second self-attention block, the third self-attention block, and the fourth self-attention block of the FSCA module are constructed, each including a multi-head attention mechanism and a LayerNorm layer. The feature $$F_{shape}^{4}$$

is transposed by the tensor.transpose( ) function in PyTorch into feature $$F_{shape}^{\prime 4},$$

$$F_{shape}^{\prime 4} \in R^{T \times 512}.$$

The feature $$F'^{4}_{shape}$$

is input into the multi-head attention mechanism of the first self-attention block to acquire feature $$F^{5-1}_{shape},$$

the feature $$F^{5-1}_{shape}$$

is input into the LayerNorm layer of the first self-attention block to acquire feature $$F'^{5-1}_{shape},$$

and the feature $$F'^{5-1}_{shape}$$

is added to the feature $$F'^{4}_{shape}$$

to acquire feature $$F^{5}_{shape}.$$

The feature $$F^{5}_{shape}$$

is input into the multi-head attention mechanism of the second self-attention block to acquire feature $$F^{6-1}_{shape},$$

the feature $$F^{6-1}_{shape}$$

is input into the LayerNorm layer of the second self-attention block to acquire feature $$F'^{6-1}_{shape},$$

and the feature $$F'^{6-1}_{shape}$$

is added to the feature $$F^{5}_{shape}$$

to acquire feature $$F^{6}_{shape}.$$

The feature $$F^{6}_{shape}$$

is input into the multi-head attention mechanism of the third self-attention block to acquire feature $$F^{7-1}_{shape},$$

the feature $$F^{7-1}_{shape}$$

is input into the LayerNorm layer of the third self-attention block to acquire feature $$F'^{7-1}_{shape},$$

and the feature $$F'^{7-1}_{shape}$$

is added to the feature $$F^{6}_{shape}$$

to acquire feature $$F^{7}_{shape}.$$

The feature $$F_{shape}^{7}$$

is input into the multi-head attention mechanism of the fourth self-attention block to acquire feature $$F_{shape}^{8-1},$$

the feature $$F_{shape}^{8-1}$$

is input into the LayerNorm layer of the fourth self-attention block to acquire feature $$F'^{8-1}_{shape},$$

and the feature $$F'^{8-1}_{shape}$$

is added to the feature $$F_{shape}^{7}$$

to acquire feature $$F_{shape}^{8}, F_{shape}^{8} \in R^{T\times 512}.$$

e-6) The IGSCA module of the identity feature consistency network is constructed, including an identity feature mapping block, a first cross attention block (CAB), a second CAB, a third CAB, a fourth CAB, a first dilated convolutional block, a second dilated convolutional block, a third dilated convolutional block, a fourth dilated convolutional block, and a fifth dilated convolutional block.

e-7) The identity feature mapping block of the IGSCA module is constructed, including a 1D convolutional layer, a LayerNorm layer, and a LeakeyReLU function. The facial identity feature $$F_{id}^{n}$$

is input into the 1D convolutional layer of the identity feature mapping block to acquire feature $$F_{id}^{1-1}.$$

The feature $$F_{id}^{1-1}$$

is input into the LayerNorm layer of the identity feature mapping block to acquire feature $$F_{id}^{1-2}.$$

The feature $$F_{id}^{1-2}$$

is input into the LeakeyReLU function of the identity feature mapping block to acquire feature $$F_{id}^{1-3}.$$

The feature $$F_{id}^{1-3}$$

is transposed by the tensor.transpose( ) function in PyTorch into feature $$F_{id}^{1}, F_{id}^{1} \in R^{T\times 512}.$$

e-8) The first CAB, the second CAB, the third CAB, and the fourth CAB of the IGSCA module are constructed, each including a multi-head attention mechanism, a LayerNorm layer, and a LeakeyReLU function. A linear transformation is performed on the feature $$F_{id}^{1}$$

to acquire a value of query in the multi-head attention mechanism of the first CAB. A linear transformation is performed on the feature $$F_{shape}^{8}$$

to acquire values of key and value in the multi-head attention mechanism of the first CAB, thereby acquiring output feature $$F_{shape}^{9-1}$$

of the multi-head attention mechanism in the first CAB. The feature $$F_{shape}^{9-1}$$

is input into the LayerNorm layer of the first CAB to acquire feature $$F'^{9-1}_{shape}.$$

The feature $$F'^{9-1}_{shape}$$

is added to the feature $$F_{shape}^{8}$$

to acquire feature $$F_{shape}^{9}.$$

A linear transformation is performed on the feature $$F_{id}^{1}$$

to acquire a value of query in the multi-head attention mechanism of the second CAB. A linear transformation is performed on the feature $$F_{shape}^{9}$$

to acquire values of key and value in the multi-head attention mechanism of the second CAB, thereby acquiring output feature $$F_{shape}^{10-1}$$

of the multi-head attention mechanism in the second CAB. The feature $$F_{shape}^{10-1}$$

is input into the LayerNorm layer of the second CAB to acquire feature $$F'^{10-1}_{shape}$$

The feature $$F'^{10-1}_{shape}$$

is added to the feature $$F_{shape}^{9}$$

to acquire feature $$F_{shape}^{10}.$$

A linear transformation is performed on the feature $$F_{id}^{1}$$

to acquire a value of query in the multi-head attention mechanism of the third CAB. A linear transformation is performed on the feature $$F_{shape}^{10}$$

to acquire values of key and value in the multi-head attention mechanism of the third CAB, thereby acquiring output feature $$F_{shape}^{11-1}$$

of the multi-head attention mechanism in the third CAB. The feature $$F_{shape}^{11-1}$$

is input into the LayerNorm layer of the third CAB to acquire feature $$F'^{11-1}_{shape}.$$

The feature $$F'^{11-1}_{shape}$$

is added to the feature $$F_{shape}^{10}$$

to acquire feature $$F_{shape}^{11}.$$

A linear transformation is performed on the feature $$F_{id}^{1}$$

to acquire a value of query in the multi-head attention mechanism of the fourth CAB. A linear transformation is performed on the feature $$F_{shape}^{11}$$

to acquire values of key and value in the multi-head attention mechanism of the fourth CAB, thereby acquiring an output feature $$F_{shape}^{12-1}$$

of the multi-head attention mechanism in the fourth CAB. The feature $$F_{shape}^{12-1}$$

is input into the LayerNorm layer of the fourth CAB to acquire feature $$F'^{12-1}_{shape}.$$

The feature $$F'^{12-1}_{shape}$$

is added to the feature $$F_{shape}^{11}$$

to acquire feature $$F_{shape}^{12}.$$

e-9) The first dilated convolutional block, the second dilated convolutional block, the third dilated convolutional block, the fourth dilated convolutional block, and the fifth dilated convolutional block of the IGSCA module are constructed, each including a dilated convolutional layer, a group normalization (GroupNorm) layer, and a LeakeyReLU function. The feature $$F_{shape}^{12}$$

is input into the dilated convolutional layer of the first dilated convolutional block to acquire feature $$F_{shape}^{13-1},$$

the feature $$F_{shape}^{13-1}$$

is input into the GroupNorm layer of the first dilated convolutional block to acquire feature $$F_{shape}^{13-2},$$

the feature $$F_{shape}^{13-2}$$

is input into the LeakeyReLU function of the first dilated convolutional block to acquire feature $$F'^{13-2}_{shape},$$

and the feature $$F'^{13-2}_{shape}$$

is added to the feature $$F_{shape}^{12}$$

to acquire feature $$F_{shape}^{13}.$$

The feature $$F_{shape}^{13}$$

is input into the dilated convolutional layer of the second dilated convolutional block to acquire feature $$F_{shape}^{14-1},$$

the feature $$F_{shape}^{14-1}$$

is input into the GroupNorm layer of the second dilated convolutional block to acquire feature $$F_{shape}^{14-2},$$

the feature $$F_{shape}^{14-2}$$

is input into the LeakeyReLU function of the second dilated convolutional block to acquire feature $$F_{shape}'^{14-2},$$

and the feature $$F_{shape}'^{14-2}$$

is added to the feature $$F_{shape}^{13}$$

to acquire feature $$F_{shape}^{14}.$$

The feature $$F_{shape}^{14}$$

is input into the dilated convolutional layer of the third dilated convolutional block to acquire feature $$F_{shape}^{15-1},$$

the feature $$F_{shape}^{15-1}$$

is input into the GroupNorm layer of the third dilated convolutional block to acquire feature $$F_{shape}^{15-2},$$

the feature $$F_{shape}^{15-2}$$

is input into the LeakeyReLU function of the third dilated convolutional block to acquire feature $$F_{shape}'^{15-2},$$

and the feature $$F_{shape}'^{15-2}$$

is added to the feature $$F_{shape}^{14}$$

to acquire feature $$F_{shape}^{15}.$$

The feature $$F_{shape}^{15}$$

is input into the dilated convolutional layer of the fourth dilated convolutional block to acquire feature $$F_{shape}^{16-1},$$

the feature $$F_{shape}^{16-1}$$

is input into the GroupNorm layer of the fourth dilated convolutional block to acquire feature $$F_{shape}^{16-2},$$

the feature $$F_{shape}^{16-2}$$

is input into the LeakeyReLU function of the fourth dilated convolutional block to acquire feature $$F'^{16-2}_{shape},$$

and the feature $$F'^{16-2}_{shape}$$

is added to the feature $$F^{15}_{shape}$$

to acquire feature $$F^{16}_{shape}.$$

The feature $$F^{16}_{shape}$$

is input into the dilated convolutional layer of the fifth dilated convolutional block to acquire feature $$F^{17-1}_{shape},$$

the feature $$F^{17-1}_{shape}$$

is input into the GroupNorm layer of the fifth dilated convolutional block to acquire feature $$F^{17-2}_{shape},$$

the feature $$F^{17-2}_{shape}$$

is input into the LeakeyReLU function of the fifth dilated convolutional block to acquire feature $$F'^{17-2}_{shape},$$

and the feature $$F'^{17-2}_{shape}$$

is added to the feature $$F^{16}_{shape}$$

to acquire the identity and face shape consistency feature $F_{ISC}$, $F_{ISC} \in R^{512}$.

In this embodiment, in the step e-3), the 1D convolutional layer of the temporal convolutional block includes a convolution kernel with a size of 1, a stride of 2, and a padding of 0. In the step e-4), the 1D convolutional layer of each of the first residual convolutional block, the second residual convolutional block, and the third residual convolutional block includes a convolution kernel with a size of 1, a stride of 2, and a padding of 0. In the step e-5), the multi-head attention mechanism of each of the first self-attention block, the second self-attention block, the third self-attention block, and the fourth self-attention block includes 6 heads. In the step e-7), the 1D convolutional layer of the identity feature mapping block includes a convolution kernel with a size of 3, a stride of 1, and a padding of 1. In the step e-8), the multi-head attention mechanism of each of the first CAB, the second CAB, the third CAB, and the fourth CAB includes 8 heads. In the step c-9), the dilated convolutional layer of each of the first dilated convolutional block and the second dilated convolutional block includes a convolution kernel with a size of 3, a stride of 1, a padding of 0, and a dilation factor of 2. The dilated convolutional layer of each of the third dilated convolutional block, the fourth dilated convolutional block, and the fifth dilated convolutional block includes a convolution kernel with a size of 3, a stride of 1, a padding of 0, and a dilation factor of 4. The GroupNorm layer of each of the first dilated convolutional block, the second dilated convolutional block, the third dilated convolutional block, the fourth dilated convolutional block, and the fifth dilated convolutional block has a group size of 16.

In an embodiment of the present disclosure, the step f) is as follows.

f-1) The facial identity feature $$F^{n}_{id}$$

is input into the fusion unit of the identity feature consistency network. A mean of the facial identity feature $$F^{n}_{id}$$

is calculated by a torch.mean( ) function in PyTorch to acquire identity feature $$F^{2}_{id},\ F^{2}_{id} \in R^{512}.$$

f-2) The identity feature $$F^{2}_{id}$$

is concatenated with the identity and face shape consistency feature $F_{ISC}$ by a torch.concat( ) function in PyTorch to acquire the feature $F_{IC}$.

In an embodiment of the present disclosure, the step g) is as follows.

g-1) The loss function L is calculated by $L=\eta L_{sid}+\lambda L(f_{emb})$. $\eta$ and $\lambda$ are scaling factors. $L_{sid}$ denotes an embedding optimization loss of a fake identity. $L(f_{emb})$ denotes a supervised contrastive learning loss. This loss is a prior art. For details, please refer to Kim J, Lee J, Zhang B T. Smooth-swap: a simple enhancement for face-swapping with smoothness[C]//Proceedings of the IEEE/CVF Conference on Computer Vision and Pattern Recognition. 2022: 10779-10788.

$$L_{sid} = \frac{1}{N_F} 1\{y_i^s = y_j^s\} \sum_{i \in N_F} \delta(F_{id}^i, F_{id}^j) - \frac{1}{N_R} 1\{y_i^s = y_j^s\} \sum_{i \in N_R} \delta(F_{id}^i, F_{id}^j).$$

$$1\{y_i^s = y_j^s\}$$

indicates that a value of 1 is taken when $$y_i^s$$

equals $$y_j^s$$

and a value of 0 is taken when $$y_i^s$$

is not equal to $$y_j^s.$$

$$y_i^s$$

denotes the source identity label of the i-th image frame $X_i$, $i \in \{1, \ldots, L\}$. $\delta(\cdot,\cdot)$ denotes the cosine similarity calculation function.

$$F_{id}^i$$

denotes a facial identity feature of i-th video $V_i$ in the training set, $i \in \{1, \ldots, N\}$.

$$F_{id}^j$$

denotes a facial identity feature of j-th video $V_i$ in the training set, $j \in \{1, \ldots, N\}$.

g-2) The identity feature consistency network is trained by an adaptive moment estimation (Adam) optimizer through the loss function L to acquire the optimized identity feature consistency network.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

Experimental Results

Experiments were conducted on multiple datasets, including FaceForensics++(FF++), Deepfake Detection (DFD), Celeb DF (CDF), and Deepfake detection challenge preview (DFDCP). In the present disclosure, a FF++dataset was taken as the training set, and Area Under Curve (AUC) was taken as an evaluation indicator for faking. As shown in Table 1, on the intra-domain dataset FF++, the AUC detected by Deepfake was 99.72%, while on cross-domain datasets such as DFD, CDF, and DFDCP, the AUC detected by Deepfake reached 86.58%, 76.52%, and 70.43%, respectively.

Figure 4:
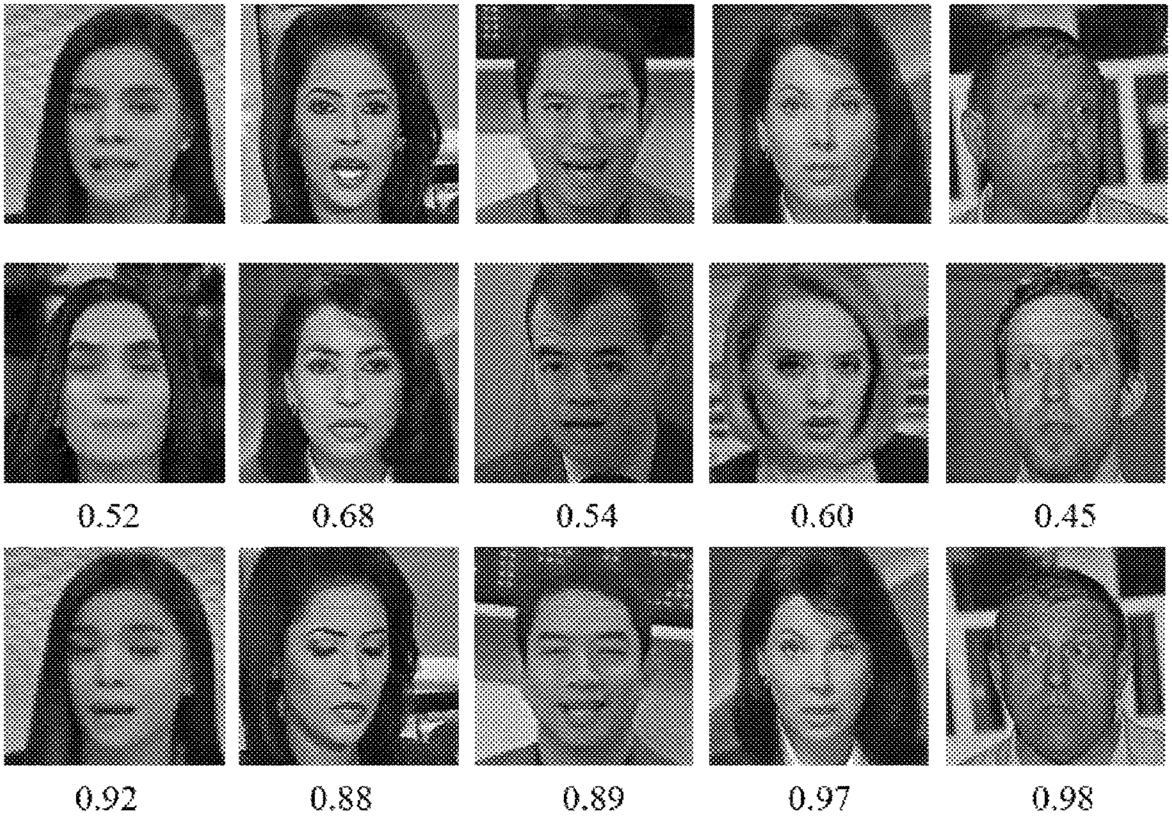
FIG. 4 shows the similarity between some test videos and the reference video on the FF++test set.

FIG. 4 shows the similarity between some test videos and the reference video on the FF++ test set. The first row demonstrates reference videos, the second row demonstrates test fake videos and their corresponding similarity, and the third row demonstrates test real videos and their corresponding similarity. The fake video has a low similarity with the reference video, while the real video has a high similarity with the reference video.

To demonstrate the effectiveness of the various modules proposed in the present disclosure, experiments were conducted on multiple datasets, as shown in Table 2. The combination of Arcface and RNN was taken the baseline for comparison, where w/o denotes without, i.e. missing a certain component, FSCA denotes the face shape consistency self-attention module, CAB denotes the cross attention block in the IGSCA module, and ISE denotes the identity shape encoder, which is the entire model of the present disclosure. Compared to the baseline, the performance of the method of the present disclosure is improved by about 7% to 12%, demonstrating the effectiveness of introducing 3D face shapes. The face shape consistency attention model proposed in the present disclosure uses a self-attention mechanism to guide the model to learn the consistency of face shapes in videos. When this module is not used, the performance decreases by about 7% to 16%, proving the effectiveness of the face shape consistency attention module. The CAB proposed in the present disclosure guides the model to learn the relationship between the 3D face shape and the identity feature, and the performance decreases by about 3% to 13% when this module is not used, proving the effectiveness of the module.

TABLE 1

| | Dataset | | | |
|---|---|---|---|---|
| | FF++ | DFD | CDF | DFDCP |
| AUC | 99.72 | 86.58 | 76.52 | 70.43 |

TABLE 2

| | FF++ | DFD | CDF |
|---|---|---|---|
| Baseline | 92.45 | 74.98 | 70.28 |
| w/o FCSAM | 92.50 | 70.42 | 60.41 |
| w/o CAB | 96.48 | 75.35 | 63.39 |
| ISE | 99.72 | 86.58 | 76.52 |

The invention claimed is:

1. A Deepfake detection method based on identity and face shape features, comprising the following steps:

a) acquiring videos to form a training set and a test set, extracting a tensor $X_{train}$ from the training set, and extracting tensors $$X'_{test} \text{ and } X'_{ref}$$

from the test set;

b) inputting the tensor $X_{train}$ into an identity encoder to acquire a facial identity feature $$F_{id}^{n};$$

c) constructing an identity feature consistency network, comprising a three-dimensional (3D) reconstruction encoder, an identity and face shape consistency extraction network, and a fusion unit;

d) inputting the tensor $X_{train}$ into the 3D reconstruction encoder of the identity feature consistency network to acquire a face shape feature $F_{shape}$;

e) inputting the face shape feature $F_{shape}$ and the facial identity feature $$F_{id}^{n}$$

into the identity and face shape consistency extraction network of the identity feature consistency network to acquire an identity and face shape consistency feature $F_{ISC}$;

f) inputting the facial identity feature $$F_{id}^{n}$$

and the identity and face shape consistency feature $F_{ISC}$ into the fusion unit of the identity feature consistency network for fusing to acquire a feature $F_{IC}$;

g) calculating a loss function L, and training the identity feature consistency network through the loss function L to acquire an optimized identity feature consistency network; and h) inputting the tensor $$X'_{test}$$

into the optimized identity feature consistency network to acquire a feature $$F'_{IC};$$

inputting $$X'_{ref}$$

into the optimized identity feature consistency network to acquire a feature $$F''_{IC};$$

and calculating a similarity value $$S \text{ by } s = \delta(F'_{IC}, F''_{IC}),$$

wherein δ(·,·) denotes a cosine similarity calculation function; determining that a face in a video is a real face if the similarity value S is greater than or equal to a threshold τ; and determining that the face in the video is a fake face if the similarity value S is less than τ.

2. The Deepfake detection method based on the identity and the face shape features according to claim 1, wherein the step a) comprises:

a-1) acquiring, from a facial forgery dataset FaceForensics++, N videos as the training set $V_{train}$ and M videos as the test set $V_{test}$, wherein $V_{train}=V_F+V_R=\{V_1,V_2, \ldots, V_n, \ldots, V_N\}$; the training set comprises $N_F$ fake videos and $N_R$ real videos, $N_F+N_R=N$; $V_F$ denotes a fake video set, and $V_R$ denotes a real video set; $V_n$ denotes an n-th video, $n\in\{1, \ldots, N\}$; the n-th video comprises L image frames, $V_n=\{x_1, x_2, \ldots, x_j, \ldots, X_L\}$; $x_j$ denotes a j-th image frame, $j\in\{1, \ldots, L\}$, and $x_j$ corresponds to a class label $y_j$; when the j-th image frame $x_j$ is a real image, $x_j$ is 0; when the j-th image frame X is a fake image, $x_j$ is 1; the j-th image frame $x_j$ corresponds to a source identity label $$y_j^s;$$

$$V_{test} = V'_F + V'_R = \{V'_1, V'_2, \ldots, V'_m, \ldots, V'_M\};$$

the test set comprises $M_F$ fake videos and $M_R$ real videos, $M_F+M_R=M$;

$$V'_F$$

denotes a take video set, and $$V'_R$$

denotes a real video set; and $$V_m'$$

denotes an m-th video, m∈{1, . . . , M};

a-2) reading, by VideoReader, the n-th video $V_n$ in the training set frame by frame; randomly extracting T consecutive video frames from the n-th video $V_n$ as a training video $V_{train}$; detecting, by a multi-task cascaded convolutional network (MTCNN) algorithm, a facial keypoint in each video frame of the training video $V_{train}$, and calibrating a facial image; and cutting a calibrated facial image to form a facial image matrix $$X'_{train};$$

a-3) reading, by VideoReader, the m-th video $$V_m'$$

of the fake video set $$V_F'$$

in the test set frame by frame; and randomly extracting T consecutive video frames from the m-th video $$V_m'$$

as a test video $V_{test\_1}$; reading, by VideoReader, the m-th video $$V_m'$$

of the real video set $$V_R'$$

in the test set frame by frame; randomly extracting two sets of T consecutive video frames from the m-th video $$V_m'$$

wherein a first set of consecutive video frames forms a test video $V_{test\_2}$, and a second set of consecutive video frames forms a reference video $V_{ref}$; acquiring a test video $V_{test}$ by $V_{test}=V_{test\_1}+V_{test\_2}$; detecting, by the MTCNN algorithm, a facial keypoint in each video frame of the test video $V_{test}$, and calibrating a facial image; cutting a calibrated facial image to form a facial image matrix $$X'_{test};$$

detecting, by the MTCNN algorithm, a facial keypoint in each video frame of the reference video $V_{ref}$, and calibrating a facial image; and cutting a calibrated facial image to form a facial image matrix $$X'_{ref};$$

and a-4) transposing, by a ToTensor( ) function, the facial image matrix $$X'_{train}$$

into the tensor $X_{train}$, $X_{train} \in R^{T\times C\times H\times W}$, transposing the facial image matrix $$X'_{test}$$

into a tensor $X_{test}$, $X_{test} \in R^{T\times C\times H\times W}$, and transposing the facial image matrix $$X'_{ref}$$

into a tensor $X_{ref}$, $X_{ref} \in R^{T\times C\times H\times W}$, wherein R denotes a real number space, C denotes a channel number of the image frame, H denotes a height of the image frame, and W denotes a width of the image frame.

3. The Deepfake detection method based on the identity and the face shape features according to claim 2, wherein the step b) comprises: constructing the identity encoder, comprising an additive angular margin loss (ArcFace) face recognition model; inputting the tensor $X_{train}$ into the identity encoder to acquire an identity feature $$F'_{id}$$

of the n-th video $V_n$ in the training set, $$F'_{id} \in R^{T\times 512};$$

and transposing, by a tensor.transpose( ) function, the identity feature $$F'_{id}$$

into the facial identity feature $$F_{id}^{n}$$

of the n-th video $V_n$ in the training set, $$F_{id}^{n} \in R^{512\times T},$$

$n\in\{1, \ldots, N\}$.

4. The Deepfake detection method based on the identity and the face shape features according to claim 3, wherein the step d) comprises:

d-1) constructing the 3D reconstruction encoder of the identity feature consistency network, comprising a pre-trained Deep3DFaceRecon network;

d-2) inputting the tensor $X_{train}$ into the 3D reconstruction encoder to acquire a 3D morphable model (3DMM) identity feature $$F'_{shape};$$

d-3) transposing, by the tensor.transpose( ) function, the 3DMM identity feature $$F'_{shape}$$

into the face shape feature $F_{shape}$, $F_{shape} \in R^{257\times T}$.

5. The Deepfake detection method based on the identity and the face shape features according to claim 3, wherein the step e) comprises:

e-1) constructing the identity and face shape consistency extraction network of the identity feature consistency network, comprising a face shape consistency self-attention (FSCA) module and an identity guided shape consistency attention (IGSCA) module;

e-2) constructing the FSCA module of the identity and face shape consistency extraction network, comprising a temporal convolutional block, a first residual convolutional block, a second residual convolutional block, a third residual convolutional block, a first self-attention block, a second self-attention block, a third self-attention block, and a fourth self-attention block;

e-3) constructing the temporal convolutional block of the FSCA module, comprising a one-dimensional (1D) convolutional layer, a layer normalization (LayerNorm) layer, and a leaky rectified linear unit (LeakeyReLU) function; inputting the face shape feature $F_{shape}$ into the 1D convolutional layer to acquire a feature $$F_{shape}^{1-1};$$

inputting the feature $$F_{shape}^{1-1}$$

into the LayerNorm layer to acquire a feature $$F_{shape}^{1-2};$$

and inputting the feature $$F_{shape}^{1-2}$$

into the LeakeyReLU function to acquire a feature $$F_{shape}^{1},\ F_{shape}^{1} \in R^{512\times T};$$

e-4) constructing the first residual convolutional block, the second residual convolutional block, and the third residual convolutional block of the FSCA module, each comprising a 1D convolutional layer, a LayerNorm layer, and a LeakeyReLU function; inputting the feature $$F_{shape}^{1}$$

into the 1D convolutional layer of the first residual convolutional block to acquire a feature $$F_{shape}^{2-1},$$

inputting the feature $$F_{shape}^{2-1}$$

into the LayerNorm layer of the first residual convolutional block to acquire a feature $$F_{shape}^{2-2},$$

inputting the feature $$F_{shape}^{2-2}$$

into the LeakeyReLU function of the first residual convolutional block to acquire a feature $$F_{shape}^{2-3},$$

and adding the feature $$F_{shape}^{1}$$

to the feature $$F_{shape}^{2-3}$$

to acquire a feature $$F_{shape}^{2};$$

inputting the feature $$F_{shape}^{2}$$

into the 1D convolutional layer of the second residual convolutional block to acquire a feature $$F_{shape}^{3-1},$$

inputting the feature $$F_{shape}^{3-1}$$

into the LayerNorm layer of the second residual convolutional block to acquire a feature $$F_{shape}^{3-2},$$

inputting the feature $$F_{shape}^{3-2}$$

into the LeakeyReLU function of the second residual convolutional block to acquire a feature $$F_{shape}^{3-3},$$

and adding the feature $$F_{shape}^{2}$$

to the feature $$F_{shape}^{3-3}$$

to acquire a feature $$F_{shape}^{3};$$

and inputting the feature $$F_{shape}^{3}$$

into the 1D convolutional layer of the third residual convolutional block to acquire a feature $$F_{shape}^{4-1},$$

inputting the feature $$F_{shape}^{4-1}$$

into the LayerNorm layer of the third residual convolutional block to acquire a feature $$F_{shape}^{4-2},$$

inputting the feature $$F_{shape}^{4-2}$$

into the LeakeyReLU function of the third residual convolutional block to acquire a feature $$F_{shape}^{4-3},$$

and adding the feature $$F_{shape}^{3}$$

to the feature $$F_{shape}^{4-3}$$

to acquire a feature $$F_{shape}^{4};$$

e-5) constructing the first self-attention block, the second self-attention block, the third self-attention block, and the fourth self-attention block of the FSCA module, each comprising a multi-head attention mechanism and a LayerNorm layer; transposing, by the tensor.transpose( ) function-, the feature $F_{shape}^{4}$ into a feature $F_{shape}^{\prime 4}, F_{shape}^{\prime 4} \in R^{T\times 512}$;

inputting the feature $F_{shape}^{\prime 4}$ into the multi-head attention mechanism of the first self-attention block to acquire a feature $F_{shape}^{5-1}$, inputting the feature $F_{shape}^{5-1}$ into the LayerNorm layer of the first self-attention block to acquire a feature $F_{shape}^{\prime 5-1}$, and adding the feature $F_{shape}^{\prime 5-1}$ to the feature $F_{shape}^{\prime 4}$ to acquire a feature $F_{shape}^{5}$;

inputting the feature $F_{shape}^{5}$ into the multi-head attention mechanism of the second self-attention block to acquire a feature $F_{shape}^{6-1}$, inputting the feature $F_{shape}^{6-1}$ into the LayerNorm layer of the second self-attention block to acquire a feature $F_{shape}^{\prime 6-1}$, and adding the feature $F_{shape}^{\prime 6-1}$ to the feature $F_{shape}^{5}$ to acquire a feature $F_{shape}^{6}$;

inputting the feature $F_{shape}^{6}$ into the multi-nead attention mechanism of the third self-attention block to acquire a feature $F_{shape}^{7-1}$, inputting the feature $F_{shape}^{7-1}$ into the LayerNorm layer of the third self-attention block to acquire a feature $F_{shape}^{\prime 7-1}$, and adding the feature $F_{shape}^{\prime 7-1}$ to the feature to $F_{shape}^{6}$ to acquire a feature $$F_{shape}^{7};$$

and inputting the feature $$F_{shape}^{7}$$

into the multi-head attention mechanism of the fourth self-attention block to acquire a feature $$F_{shape}^{8-1},$$

inputting the feature $$F_{shape}^{8-1}$$

into the LayerNorm layer of the fourth self-attention block to acquire a feature $$F_{shape}^{\prime 8-1},$$

and adding the feature $$F_{shape}^{\prime 8-1}$$

to the feature $$F_{shape}^{7}$$

to acquire a feature $$F_{shape}^{8},$$

$$F_{shape}^{8} \in R^{T \times 512};$$

e-6) constructing the IGSCA module of the identity feature consistency network, comprising an identity feature mapping block, a first cross attention block (CAB), a second CAB, a third CAB, a fourth CAB, a first dilated convolutional block, a second dilated convolutional block, a third dilated convolutional block, a fourth dilated convolutional block, and a fifth dilated convolutional block;

e-7) constructing the identity feature mapping block of the IGSCA module, comprising a 1D convolutional layer, a LayerNorm layer, and a LeakeyReLU function; inputting the facial identity feature $$F_{id}^{n}$$

into the 1D convolutional layer of the identity feature mapping block to acquire a feature $$F_{id}^{1-1};$$

inputting the feature $$F_{id}^{1-1}$$

into the LayerNorm layer of the identity feature mapping block to acquire a feature $$F_{id}^{1-2};$$

inputting the feature $$F_{id}^{1\text{-}2}$$

into the LeakeyReLU function of the identity feature mapping block to acquire a feature $$F_{id}^{1\text{-}3};$$

and transposing, by the tensor.transpose( ) function, the feature $$F_{id}^{1\text{-}3}$$

into a feature $$F_{id}^{1}, F_{id}^{1} \in R^{T \times 512};$$

e-8) constructing the first CAB, the second CAB, the third CAB, and the fourth CAB of the IGSCA module, each comprising a multi-head attention mechanism, a LayerNorm layer, and a LeakeyReLU function; performing a linear transformation on the feature $$F_{id}^{1}$$

to acquire a value of query in the multi-head attention mechanism of the first CAB; performing a linear transformation on the feature $$F_{shape}^{8}$$

to acquire values of key and value in the multi-head attention mechanism of the first CAB, wherein an output feature $$F_{shape}^{9\text{-}1}$$

of the multi-head attention mechanism in the first CAB is acquired; inputting the feature $$F_{shape}^{9\text{-}1}$$

into the LayerNorm layer of the first CAB to acquire a feature $$F_{shape}^{\prime 9\text{-}1};$$

adding the feature $$F_{shape}^{\prime 9\text{-}1}$$

to the feature $$F_{shape}^{8}$$

to acquire a feature $$F_{shape}^{9};$$

feature to acquire a feature performing a linear transformation on the feature $$F_{id}^{1}$$

performing a linear transformation on the feature $$F_{shape}^{9}$$

to acquire values of key and value in the multi-head attention mechanism of the second CAB, wherein an output feature $$F_{shape}^{10\text{-}1}$$

of the multi-head attention mechanism in the second CAB is acquired; inputting the feature $$F_{shape}^{10\text{-}1}$$

into the LayerNorm layer of the second CAB to acquire a feature $$F_{shape}^{\prime 10\text{-}1};$$

adding the feature $$F_{shape}^{\prime 10\text{-}1}$$

to the feature $$F_{shape}^{9}$$

to acquire a feature $$F_{shape}^{10};$$

performing a linear transformation on the feature $$F_{id}^{1}$$

to acquire a value of query in the multi-head attention mechanism of the third CAB; performing a linear transformation on the feature $$F_{shape}^{10}$$

to acquire values of key and value in the multi-head attention mechanism of the third CAB, wherein an output feature $$F_{shape}^{11\text{-}1}$$

of the multi-head attention mechanism in the third CAB is acquired; inputting the feature $$F_{shape}^{11\text{-}1}$$

into the LayerNorm layer of the third CAB to acquire a feature $$F_{shape}^{\prime 11-1};$$

adding the feature $$F_{shape}^{\prime 11-1}$$

to the feature $$F_{shape}^{10}$$

to acquire a feature $$F_{shape}^{11};$$

performing a linear transformation on the feature $$F_{id}^{1}$$

to acquire a value of query in the multi-head attention mechanism of the fourth CAB; performing a linear transformation on the feature $$F_{shape}^{11}$$

to acquire values of key and value in the multi-head attention mechanism of the fourth CAB, wherein an output feature $$F_{shape}^{12\text{-}1}$$

of the multi-head attention mechanism in the fourth CAB is acquired; inputting the feature $$F_{shape}^{12\text{-}1}$$

into the LayerNorm layer of the fourth CAB to acquire a feature $$F_{shape}'^{12\text{-}1};$$

and adding the feature $$F_{shape}'^{12\text{-}1}$$

to the feature $$F_{shape}^{11}$$

to acquire a feature $$F_{shape}^{12};$$

and e-9) constructing the first dilated convolutional block, the second dilated convolutional block, the third dilated convolutional block, the fourth dilated convolutional block, and the fifth dilated convolutional block of the IGSCA module, each comprising a dilated convolutional layer, a group normalization (GroupNorm) layer, and a LeakeyReLU function; inputting the feature $$F_{shape}^{12}$$

into the dilated convolutional layer of the first dilated convolutional block to acquire a feature $$F_{shape}^{13\text{-}1},$$

inputting the feature $$F_{shape}^{13\text{-}1}$$

into the GroupNorm layer of the first dilated convolutional block to acquire a feature $$F_{shape}^{13\text{-}2},$$

inputting the feature $$F_{shape}^{13\text{-}2}$$

into the LeakeyReLU function of the first dilated convolutional block to acquire a feature $$F_{shape}'^{13\text{-}2},$$

and adding the feature $$F_{shape}'^{13\text{-}2}$$

to the feature $$F_{shape}^{12}$$

to acquire a feature $$F_{shape}^{13};$$

inputting the feature $$F_{shape}^{13}$$

into the dilated convolutional layer of the second dilated convolutional block to acquire a feature $F_{shape}^{14\text{-}1}$, inputting the feature $F_{shape}^{14\text{-}1}$ into the GroupNorm layer of the second dilated convolutional block to acquire a feature $F_{shape}^{14\text{-}2}$, inputting the feature $F_{shape}^{14\text{-}2}$, into the LeakeyReLU function of the second dilated convolutional block to acquire a feature $F_{shape}^{\prime 14-2}$, and adding the feature $F_{shape}^{\prime 14-2}$ to the feature $F_{shape}^{13}$ to acquire a feature $F_{shape}^{14}$;

inputting the feature $F_{shape}^{14}$ into the dilated convolutional layer of the third dilated convolutional block to acquire a feature $F_{shape}^{15\text{-}1}$, inputting the feature $F_{shape}^{15\text{-}1}$ into the GroupNorm layer of the third dilated convolutional block to acquire a feature $F_{shape}^{15\text{-}2}$, inputting the feature $F_{shape}^{15\text{-}2}$ into the LeakeyReLU function of the third dilated convolutional block to acquire a feature $F_{shape}^{\prime 15-2}$, and adding the feature $F_{shape}^{\prime 15\text{-}2}$ to the feature $F_{shape}^{14}$ to acquire a feature $F_{shape}^{15}$;

inputting the feature $F_{shape}^{15}$ into the dilated convolutional layer of the fourth dilated convolutional block to acquire a feature $F_{shape}^{16\text{-}1}$, inputting the feature $F_{shape}^{16\text{-}1}$ into the GroupNorm layer of the fourth dilated convolutional block to acquire a feature $F_{shape}^{16\text{-}2}$, inputting the feature into $F_{shape}^{16\text{-}2}$ into the LeakeyReLU function of the fourth dilated convolutional block to acquire a feature $$F'^{16\text{-}2}_{shape},$$

and adding the feature $$F'^{16\text{-}2}_{shape}$$

to the feature $$F^{15}_{shape}$$

to acquire a feature $$F^{16}_{shape};$$

and inputting the feature $$F^{16}_{shape}$$

into the dilated convolutional layer of the fifth dilated convolutional block to acquire a feature $$F^{17\text{-}1}_{shape},$$

inputting the feature $$F^{17\text{-}1}_{shape}$$

into the GroupNorm layer of the fifth dilated convolutional block to acquire a feature $$F^{17\text{-}2}_{shape},$$

inputting the feature $$F^{17\text{-}2}_{shape}$$

into the LeakeyReLU function of the fifth dilated convolutional block to acquire a feature $$F'^{17\text{-}2}_{shape},$$

and adding the feature to the feature $$F'^{17\text{-}2}_{shape},$$

to the feature $$F^{16}_{shape}$$

to acquire the identity and face shape consistency feature $F_{ISC}$, $F_{ISC} \in R^{512}$.

6. The Deepfake detection method based on the identity and the face shape features according to claim 5, wherein in the step e-3), the 1D convolutional layer of the temporal convolutional block comprises a convolution kernel with a size of 1, a stride of 2, and a padding of 0;

in the step e-4), the 1D convolutional layer of each of the first residual convolutional block, the second residual convolutional block, and the third residual convolutional block comprises a convolution kernel with a size of 1, a stride of 2, and a padding of 0;

in the step e-5), the multi-head attention mechanism of each of the first self-attention block, the second self-attention block, the third self-attention block, and the fourth self-attention block comprises 6 heads;

in the step e-7), the 1D convolutional layer of the identity feature mapping block comprises a convolution kernel with a size of 3, a stride of 1, and a padding of 1;

in the step e-8), the multi-head attention mechanism of each of the first CAB, the second CAB, the third CAB, and the fourth CAB comprises 8 heads; and in the step c-9), the dilated convolutional layer of each of the first dilated convolutional block and the second dilated convolutional block comprises a convolution kernel with a size of 3, a stride of 1, a padding of 0, and a dilation factor of 2;

the dilated convolutional layer of each of the third dilated convolutional block, the fourth dilated convolutional block, and the fifth dilated convolutional block comprises a convolution kernel with a size of 3, a stride of 1, a padding of 0, and a dilation factor of 4; and the GroupNorm layer of each of the first dilated convolutional block, the second dilated convolutional block, the third dilated convolutional block, the fourth dilated convolutional block, and the fifth dilated convolutional block has a group size of 16.

7. The Deepfake detection method based on the identity and the face shape features according to claim 3, wherein the step f) comprises:

f-1) inputting the facial identity feature $$F^{n}_{id}$$

into the fusion unit of the identity feature consistency network; and calculating, by a torch.mean( ) function, a mean of the facial identity feature $$F^{n}_{id}$$

to acquire an identity feature $$F^{2}_{d},\ F^{2}_{d} \in R^{512};$$

and f-2) concatenating, by a torch.concat( ) function, the identity feature $$F_{id}^{2}$$

with the identity and face shape consistency feature $F_{ISC}$ to acquire the feature $F_{IC}$.

8. The Deepfake detection method based on the identity and the face shape features according to claim 2, wherein the step g) comprises:

g-1) calculating the loss function L by $L=\eta L_{sid}+\lambda L(f_{emb})$, wherein $\eta$ and $\lambda$ are scaling factors; $L_{sid}$ denotes an embedding optimization loss of a fake identity; $L(f_{emb})$ denotes a supervised contrastive learning loss;

$$L_{sid} = \frac{1}{N_F} 1\{y_i^s = y_j^s\} \sum_{i \in N_F} \delta(F_{id}^i, F_{id}^j) - \frac{1}{N_R} 1\{y_i^s = y_j^s\} \sum_{i \in N_R} \delta(F_{id}^i, F_{id}^j);$$

$$1\{y_i^s = y_j^s\}$$

indicates that a value of 1 is taken when $$y_i^s \text{ equals } y_j^s$$

and a value of 0 is taken when $$y_i^s$$

is not equal to $$y_j^s;$$

$$y_i^s$$

the cosine similarity calculation function;

$$F_{id}^{j}$$

denotes a facial identity feature of an i-th video $V_i$ in the training set, $i \in \{1, \ldots, N\}$; and $$F_{id}^{j}$$

denotes a facial identity feature of a j-th video $V_j$ in the training set, $J \in \{1, \ldots, N\}$; and g-2) training, by an adaptive moment estimation (Adam) optimizer, the identity feature consistency network through the loss function L to acquire the optimized identity feature consistency network.

9. The Deepfake detection method based on the identity and the face shape features according to claim 8, wherein $\eta$ is 0.2, and $\lambda$ is 0.8.

10. The Deepfake detection method based on the identity and the face shape features according to claim 1, wherein in the step h), $\tau \in (0,1)$.

* * * * *